United States Patent
Bodishbaugh et al.

(10) Patent No.: US 12,486,834 B2
(45) Date of Patent: Dec. 2, 2025

(54) CHILLED INTAKE AIR FOR INCREASED POWER GENERATION

(71) Applicant: Typhon Technology Solutions (U.S.), LLC, The Woodlands, TX (US)

(72) Inventors: Adrian Benjamin Bodishbaugh, The Woodlands, TX (US); Carrie Murtland, The Woodlands, TX (US)

(73) Assignee: Typhon Technology Solutions (U.S.), LLC, The Woodlands, TX (US)

( * ) Notice: Subject to any disclaimer, the term of this patent is extended or adjusted under 35 U.S.C. 154(b) by 0 days.

(21) Appl. No.: 18/812,564

(22) Filed: Aug. 22, 2024

(65) Prior Publication Data
US 2024/0410347 A1    Dec. 12, 2024

Related U.S. Application Data

(63) Continuation of application No. 17/987,739, filed on Nov. 15, 2022, now Pat. No. 12,078,158, which is a
(Continued)

(51) Int. Cl.
*F04B 17/06* (2006.01)
*E21B 43/26* (2006.01)

(52) U.S. Cl.
CPC .......... *F04B 17/06* (2013.01); *E21B 43/2607* (2020.05); *F05D 2210/12* (2013.01); *F05D 2220/32* (2013.01)

(58) Field of Classification Search
CPC .. F04B 17/06; E21B 43/2607; F05D 2210/12; F05D 2220/32; F02C 7/12; F02C 7/14; F02C 7/141; F02C 7/143; F02C 7/16
See application file for complete search history.

(56) References Cited

U.S. PATENT DOCUMENTS

| | | | |
|---|---|---|---|
| 3,552,134 A | 1/1971 | Arenson | |
| 5,697,207 A * | 12/1997 | Cromer | F02C 3/30 60/772 |

(Continued)

FOREIGN PATENT DOCUMENTS

| | | |
|---|---|---|
| AR | 087298 A1 | 3/2014 |
| AR | 092923 A1 | 5/2015 |

(Continued)

OTHER PUBLICATIONS

Argentina National Institute of Industrial Property, Office Action, Argentina National Patent Application No. 20200102781, May 8, 2023, 3 pages.
(Continued)

*Primary Examiner* — Steven M Sutherland
(74) *Attorney, Agent, or Firm* — Fenwick & West LLP

(57) ABSTRACT

A mobile source of electricity is converted from a transportation mode to an operational mode. A turbine disposed on the mobile source of electricity is operated to generate electricity in the operational mode. A first control valve is operated to feed a cooling agent from a cooling agent source into a heat transfer apparatus disposed in an air intake flow path of the turbine to cool intake air. A second control valve is operated to vent from the heat transfer apparatus, the cooling agent that is heated by absorbing heat from the intake air flowing through the air intake flow path. A controller controls the first and second control valves to maintain the cooling agent having predetermined properties in the heat transfer apparatus.

13 Claims, 8 Drawing Sheets

Related U.S. Application Data continuation of application No. 17/028,785, filed on Sep. 22, 2020, now Pat. No. 11,512,683.

(60) Provisional application No. 62/912,406, filed on Oct. 8, 2019.

(56) References Cited

U.S. PATENT DOCUMENTS

| | | | |
|---|---|---|---|
| 6,318,089 B1* | 11/2001 | Hiraga | F02C 7/141 |
| | | | 165/299 |
| 6,367,258 B1 | 4/2002 | Wen et al. | |
| 9,121,257 B2 | 9/2015 | Coli et al. | |
| 9,140,110 B2 | 9/2015 | Coli et al. | |
| 9,475,020 B2 | 10/2016 | Coli et al. | |
| 9,475,021 B2 | 10/2016 | Coli et al. | |
| 9,534,473 B2 | 1/2017 | Morris et al. | |
| 10,107,084 B2 | 10/2018 | Coli et al. | |
| 10,107,085 B2 | 10/2018 | Coli et al. | |
| 10,221,668 B2 | 3/2019 | Coli et al. | |
| 10,227,855 B2 | 3/2019 | Coli et al. | |
| 10,502,042 B2 | 12/2019 | Coli et al. | |
| 10,648,312 B2 | 5/2020 | Coli et al. | |
| 10,689,961 B2 | 6/2020 | Coli et al. | |
| 10,718,194 B2 | 7/2020 | Coli et al. | |
| 10,724,353 B2 | 7/2020 | Coli et al. | |
| 10,774,630 B2 | 9/2020 | Coli et al. | |
| 10,837,270 B2 | 11/2020 | Coli et al. | |
| 10,851,634 B2 | 12/2020 | Coli et al. | |
| 10,876,386 B2 | 12/2020 | Coli et al. | |
| 10,895,138 B2 | 1/2021 | Coli et al. | |
| 11,512,683 B2 | 11/2022 | Bodishbaugh et al. | |
| 2006/0254281 A1 | 11/2006 | Badeer et al. | |
| 2009/0049836 A1 | 2/2009 | Erickson et al. | |
| 2010/0089023 A1 | 4/2010 | Harada | |
| 2014/0093351 A1* | 4/2014 | Motakef | F02C 7/143 |
| | | | 415/1 |
| 2014/0096974 A1 | 4/2014 | Coli et al. | |
| 2015/0300145 A1 | 10/2015 | Coli et al. | |
| 2015/0314255 A1 | 11/2015 | Coli et al. | |
| 2016/0102613 A1 | 4/2016 | Brady | |
| 2016/0177675 A1 | 6/2016 | Morris et al. | |
| 2016/0177678 A1* | 6/2016 | Morris | F01D 15/10 |
| | | | 60/772 |
| 2016/0208593 A1 | 7/2016 | Coli et al. | |
| 2016/0208594 A1 | 7/2016 | Coli et al. | |
| 2016/0326855 A1 | 11/2016 | Coli et al. | |
| 2016/0369609 A1 | 12/2016 | Morris et al. | |
| 2017/0036178 A1 | 2/2017 | Coli et al. | |
| 2017/0037718 A1 | 2/2017 | Coli et al. | |
| 2017/0051669 A1 | 2/2017 | Chang et al. | |
| 2017/0104389 A1 | 4/2017 | Morris et al. | |
| 2017/0259227 A1 | 9/2017 | Morris et al. | |
| 2018/0045080 A1 | 2/2018 | Uechi et al. | |
| 2018/0328279 A1 | 11/2018 | Austin et al. | |
| 2018/0363434 A1 | 12/2018 | Coli et al. | |
| 2018/0363435 A1 | 12/2018 | Coli et al. | |
| 2018/0363436 A1 | 12/2018 | Coli et al. | |
| 2018/0363437 A1 | 12/2018 | Coli et al. | |
| 2018/0363438 A1 | 12/2018 | Coli et al. | |
| 2019/0020402 A1 | 1/2019 | Gharavi et al. | |
| 2019/0055827 A1 | 2/2019 | Coli et al. | |
| 2019/0063263 A1 | 2/2019 | Davis et al. | |
| 2019/0112908 A1 | 4/2019 | Coli et al. | |
| 2019/0162082 A1 | 5/2019 | Larochelle et al. | |
| 2019/0203572 A1 | 7/2019 | Morris et al. | |
| 2019/0271218 A1 | 9/2019 | Coli et al. | |
| 2019/0277125 A1 | 9/2019 | Coli et al. | |
| 2019/0277126 A1 | 9/2019 | Coli et al. | |
| 2019/0277127 A1 | 9/2019 | Coli et al. | |
| 2019/0277128 A1 | 9/2019 | Coli et al. | |
| 2019/0302706 A1 | 10/2019 | Curtis et al. | |
| 2020/0318467 A1 | 10/2020 | Coli et al. | |
| 2020/0347710 A1 | 11/2020 | Coli et al. | |
| 2020/0347711 A1 | 11/2020 | Coli et al. | |

FOREIGN PATENT DOCUMENTS

| | | | | |
|---|---|---|---|---|
| AR | 104823 | A2 | 8/2017 | |
| AR | 104824 | A2 | 8/2017 | |
| AR | 104825 | A2 | 8/2017 | |
| AR | 104826 | A2 | 8/2017 | |
| CA | 2955706 | A1 | 10/2012 | |
| CA | 2773843 | C | 1/2016 | |
| CA | 2835904 | C | 2/2017 | |
| CA | 2845347 | C | 6/2017 | |
| CA | 2900387 | C | 9/2018 | |
| CN | 2718496 | Y * | 8/2005 | F28F 1/20 |
| EP | 2904200 | A1 | 8/2015 | |
| EP | 2726705 | B1 | 8/2018 | |
| EP | 3444430 | A1 | 2/2019 | |
| EP | 3444431 | A1 | 2/2019 | |
| EP | 3444432 | A1 | 2/2019 | |
| EP | 3447239 | A1 | 2/2019 | |
| EP | 3453827 | A2 | 3/2019 | |
| EP | 3456915 | A1 | 3/2019 | |
| MX | 358054 | B | 8/2018 | |
| MX | 362628 | B | 1/2019 | |
| MX | 365888 | B | 6/2019 | |
| MX | 365889 | B | 6/2019 | |
| MX | 366049 | B | 6/2019 | |
| WO | WO 2014/053056 | A1 | 4/2014 | |

OTHER PUBLICATIONS

PCT International Search Report, PCT Application No. PCT/US20/54423, Feb. 10, 2021, 14 pages.

United States Office Action, U.S. Appl. No. 17/028,785, Mar. 3, 2022, 14 pages.

United States Office Action, U.S. Appl. No. 17/987,739, Mar. 20, 2023, 11 pages.

United States Office Action, U.S. Appl. No. 17/987,739, Sep. 1, 2023, eight pages.

United States Office Action, U.S. Appl. No. 17/987,739, Feb. 1, 2024, six pages.

* cited by examiner

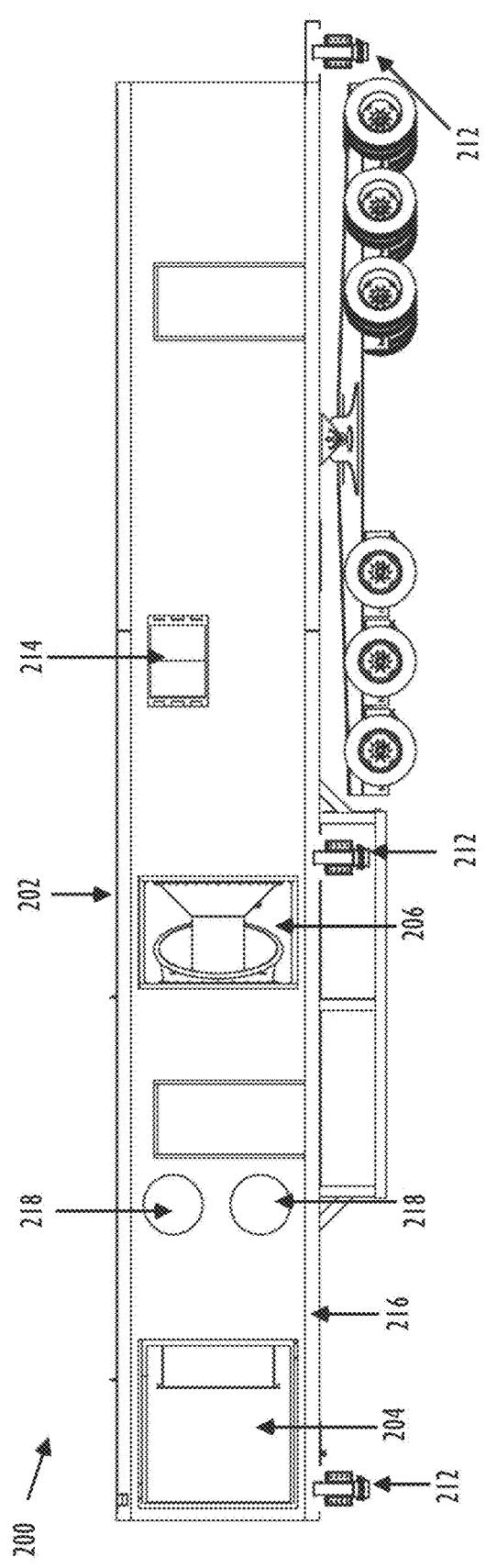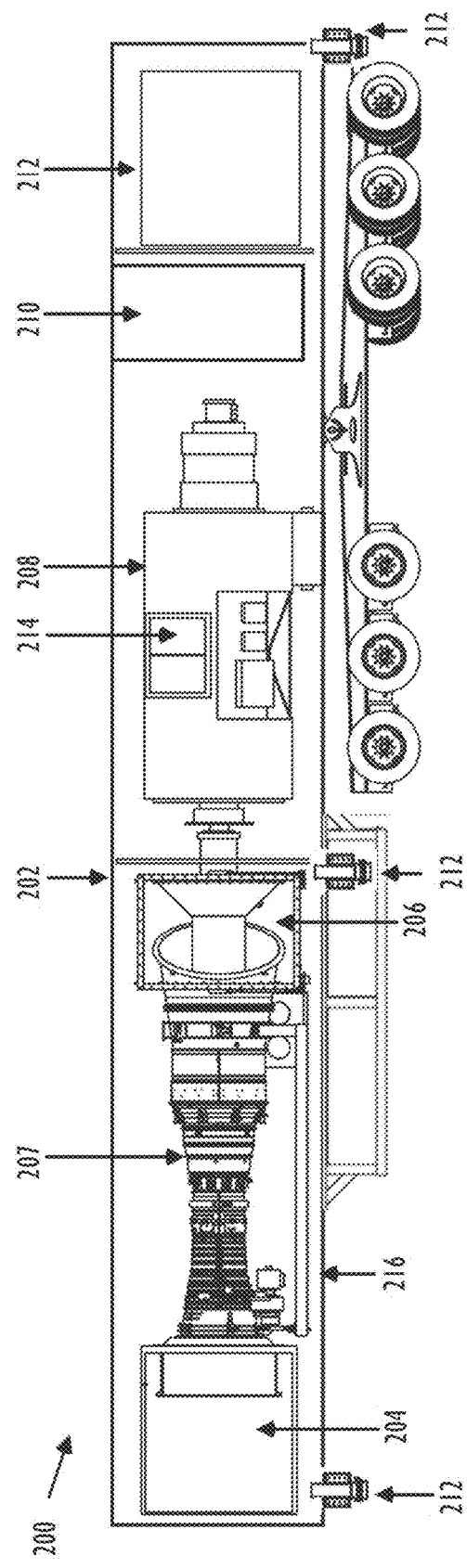
FIG. 2A
FIG. 2B

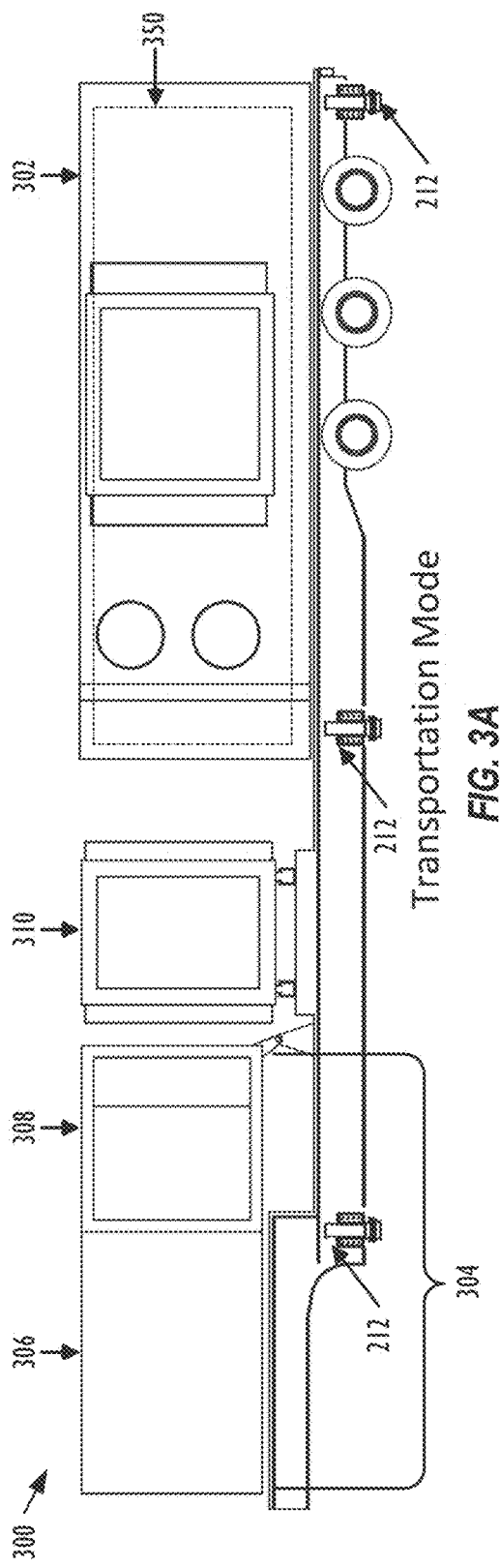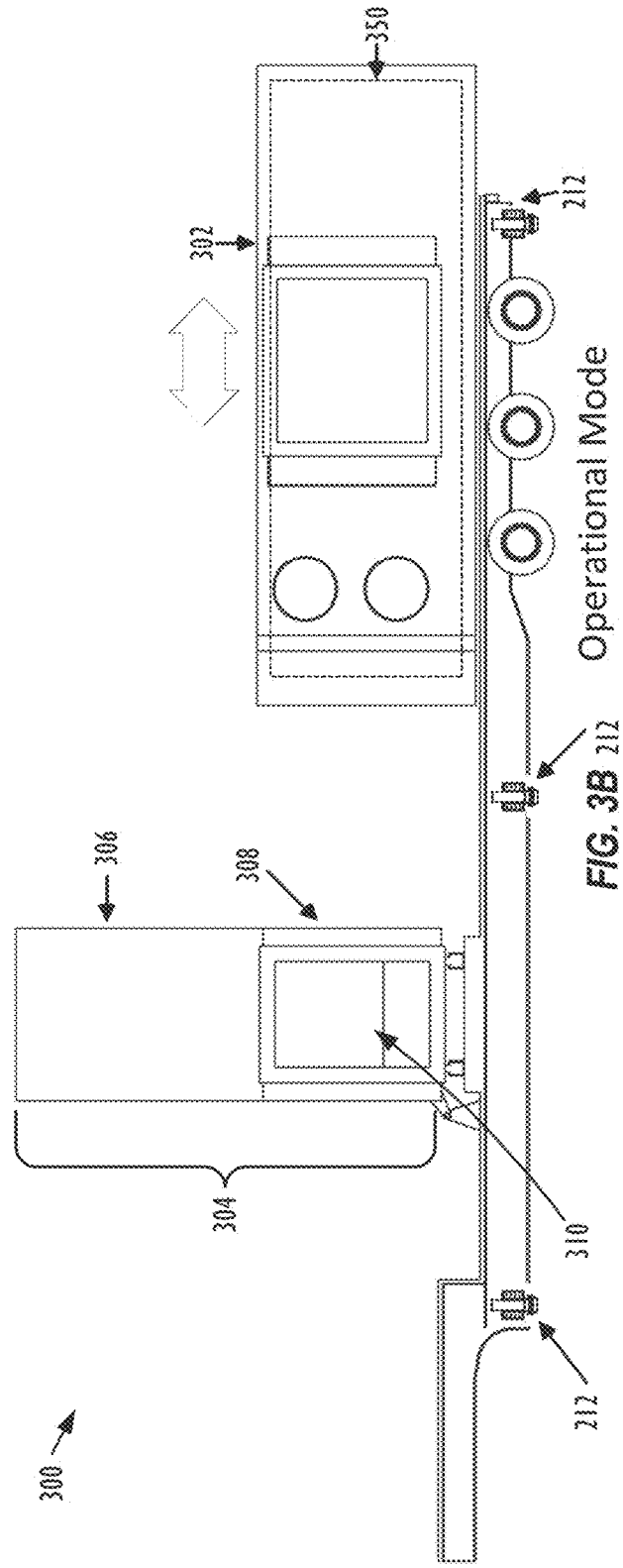

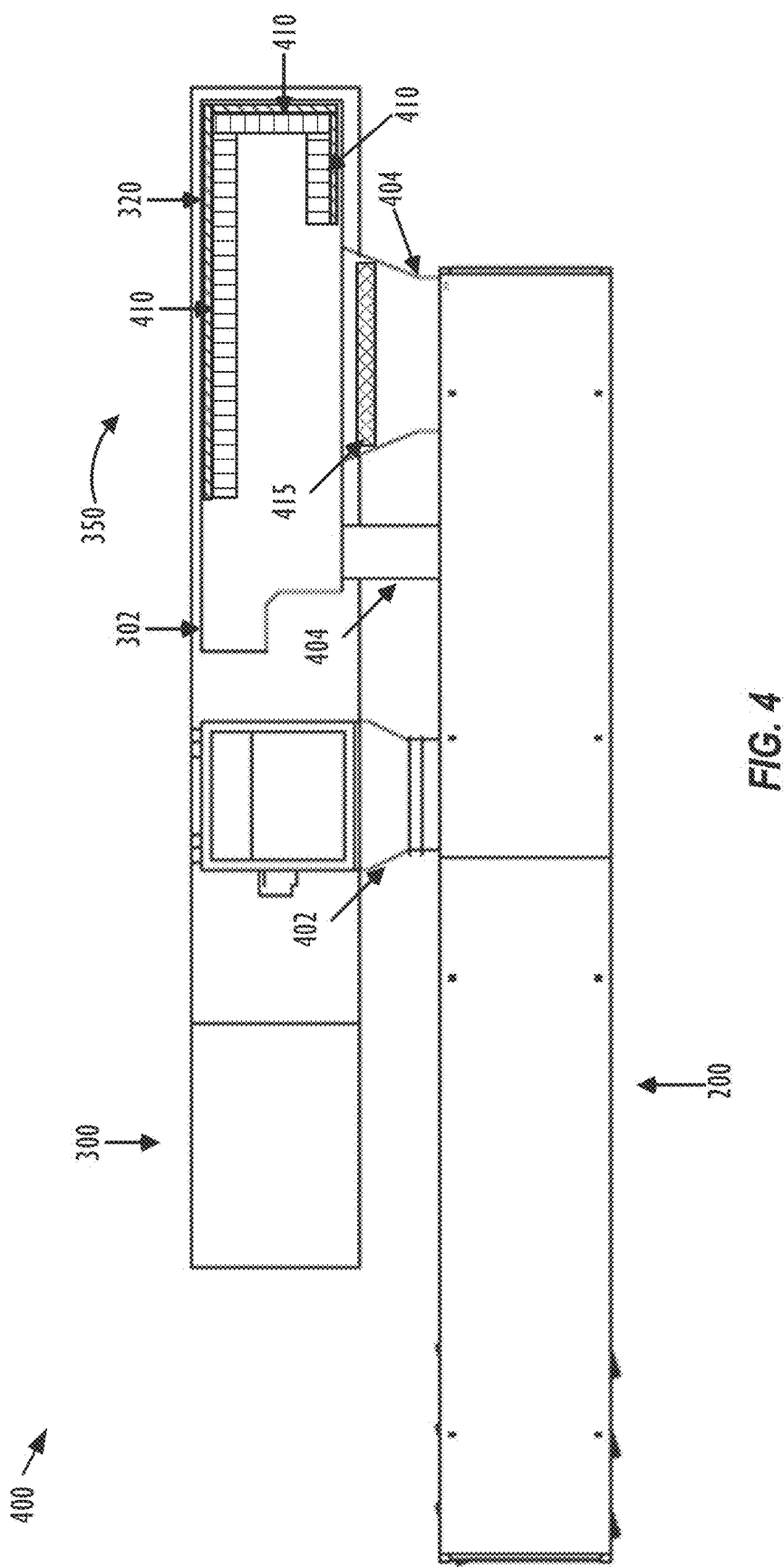

CHILLED INTAKE AIR FOR INCREASED POWER GENERATION

CROSS-REFERENCE TO RELATED APPLICATION

This application is a continuation of U.S. application Ser. No. 17/987,739, filed Nov. 15, 2022, which is a continuation of U.S. application Ser. No. 17/028,785, filed Sep. 22, 2020, now U.S. Pat. No. 11,512,683, which claims the benefit of U.S. Provisional Patent Application No. 62/912,406, filed Oct. 8, 2019 which are hereby incorporated by reference in their entirety.

TECHNICAL FIELD

This disclosure relates generally to hydraulic fracturing. More particularly, but not by way of limitation, this disclosure relates to improving power generation efficiency of a mobile power generation system by implementing a cooling system for combustion air.

BACKGROUND

Hydraulic fracturing has been commonly used by the oil and gas industry to stimulate production of hydrocarbon wells, such as oil and/or gas wells. Hydraulic fracturing, sometimes called "fracing" or "fracking," is the process of injecting fracturing fluid, which is typically a mixture of water, sand, and chemicals, into the subsurface to fracture subsurface geological formations and release hydrocarbon reserves. The fracturing fluid is pumped into a wellbore at a pressure sufficient to cause fissures within underground geological formations. Specifically, once inside the wellbore, the pressurized fracturing fluid is pressure pumped down and then out into the subsurface geological formation to fracture the underground formation.

A fluid mixture that may include water, various chemical additives, and proppants (e.g., sand or ceramic materials) can be pumped into the underground formation to fracture a geological formation and promote the extraction of the hydrocarbons, such as oil and/or gas. For example, the fracturing fluid may comprise a liquid petroleum gas, linear gelled water, gelled water, gelled oil, slick water, slick oil, poly emulsion, foam/emulsion, liquid carbon dioxide, nitrogen gas, and/or binary fluid and acid.

Implementing large-scale fracturing operations at well sites typically require extensive investment in equipment, labor, and fuel. For instance, a typical fracturing operation uses a variety of fracturing equipment, numerous personnel to operate and maintain the fracturing equipment, large amounts of fuel to power the fracturing operations, and large volumes of fracturing fluids. Planning for fracturing operations is often complex and encompasses logistical challenges that include minimizing the on-site area or "footprint" of the fracturing operations, providing adequate power and/or fuel to continuously power the fracturing operations, increasing the efficiency of the hydraulic fracturing equipment, and reducing any environmental impact resulting from fracturing operations. Thus, numerous innovations and improvements are needed to address the variety of complex and logistical challenges faced in today's fracturing operations.

SUMMARY

The following presents a simplified summary of the disclosed subject matter in order to provide a basic understanding of some aspects of the subject matter disclosed herein. This summary is not an exhaustive overview of the technology disclosed herein. It is not intended to identify key or critical elements of the disclosed subject matter or to delineate the scope of the disclosed subject matter. Its sole purpose is to present some concepts in a simplified form as a prelude to the more detailed description that is discussed later.

In one embodiment, a method includes converting a mobile source of electricity from a transportation mode to an operational mode; operating a turbine disposed on the mobile source of electricity to generate electricity in the operational mode; and feeding a cooling agent into a heat transfer apparatus disposed in an air intake flow path of the turbine to cool intake air.

In another embodiment, an apparatus for providing mobile electric power comprises: a mobile source of electricity comprising an air intake flow path, a turbine, and an air exhaust flow path; a heat transfer apparatus disposed in the air intake flow path; and a controller configured to control flow of a cooling agent in the heat transfer apparatus to cool intake air flowing in the air intake flow path.

In yet another embodiment, a cooling system comprises: a heat transfer apparatus disposed in an air intake flow path of a turbine disposed on a mobile source of electricity; and a controller configured to control flow of a cooling agent in the heat transfer apparatus to cool intake air flowing in the air intake flow path.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 2A is a schematic diagram of an embodiment of a power generator transport.

FIG. 2B is a schematic diagram of an embodiment of the power generator transport.

FIG. 3A is a schematic diagram of an embodiment of an inlet and exhaust transport.

FIG. 3B is a schematic diagram of an embodiment of an inlet and exhaust transport.

FIG. 4 is a schematic diagram of an embodiment of the two-transport mobile electric power source when in operational mode.

Figure 1:
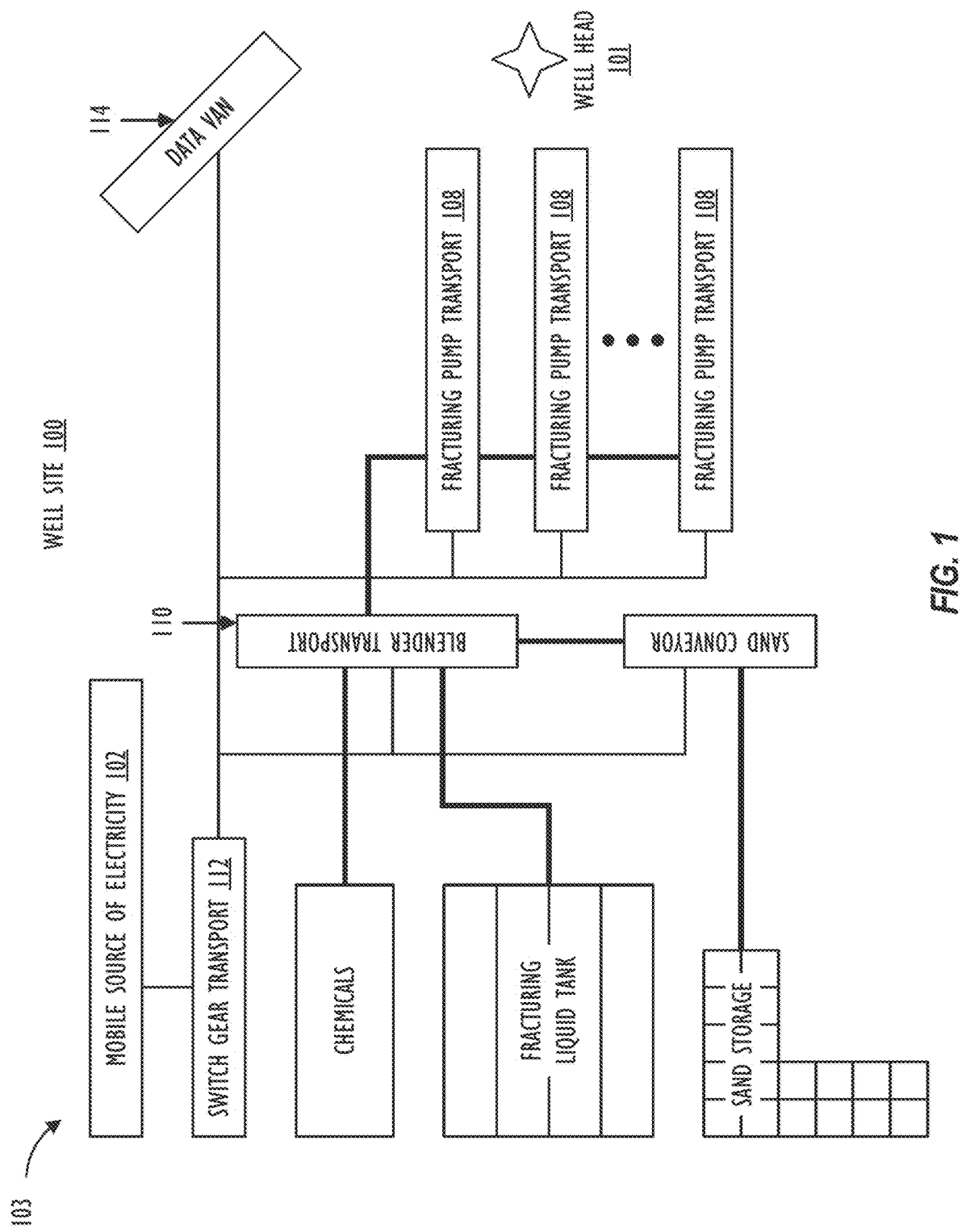
FIG. 1 is a schematic diagram of a mobile hydraulic fracturing system operating at a well site, in accordance with one or more embodiments.

While certain embodiments will be described in connection with the illustrative embodiments shown herein, the subject matter of the present disclosure is not limited to those embodiments. On the contrary, all alternatives, modifications, and equivalents are included within the spirit and scope of the disclosed subject matter as defined by the claims. In the drawings, which are not to scale, the same reference numerals are used throughout the description and in the drawing figures for components and elements having the same structure, and primed reference numerals are used for components and elements having a similar function and construction to those components and elements having the same unprimed reference numerals.

DESCRIPTION

In the following description, for purposes of explanation, numerous specific details are set forth in order to provide a thorough understanding of the inventive concept. In the interest of clarity, not all features of an actual implementation are described. Moreover, the language used in this disclosure has been principally selected for readability and instructional purposes, and may not have been selected to delineate or circumscribe the inventive subject matter, resort to the claims being necessary to determine such inventive subject matter. Reference in this disclosure to "one embodiment" or to "an embodiment" or "another embodiment" means that a particular feature, structure, or characteristic described in connection with the embodiment is included in at least one embodiment of the disclosed subject matter, and multiple references to "one embodiment" or "an embodiment" or "another embodiment" should not be understood as necessarily all referring to the same embodiment.

The terms "a," "an," and "the" are not intended to refer to a singular entity unless explicitly so defined, but include the general class of which a specific example may be used for illustration. The use of the terms "a" or "an" may therefore mean any number that is at least one, including "one," "one or more," "at least one," and "one or more than one." The term "or" means any of the alternatives and any combination of the alternatives, including all of the alternatives, unless the alternatives are explicitly indicated as mutually exclusive. The phrase "at least one of" when combined with a list of items, means a single item from the list or any combination of items in the list. The phrase does not require all of the listed items unless explicitly so defined.

As used herein, the term "transport" refers to any transportation assembly, including, but not limited to, a trailer, truck, skid, and/or barge used to transport relatively heavy structures, such as a mobile gas turbine generator.

As used herein, the term "trailer" refers to a transportation assembly used to transport relatively heavy structures, such as a mobile gas turbine generator that can be attached and/or detached from a transportation vehicle used to pull or move the trailer. In one embodiment, the trailer may include the mounts and manifold systems to connect the trailer to other equipment.

As used herein, the term "lay-down trailer" refers to a trailer that includes two sections with different vertical heights. One of the sections or the upper section is positioned at or above the trailer axles and another section or the lower section is positioned at or below the trailer axles. In one embodiment the main trailer beams of the lay-down trailer may be resting on the ground when in operational mode and/or when uncoupled from a transportation vehicle, such as a tractor.

As used herein, the term "gas turbine generator" refers to both the gas turbine and the generator sections of a gas-turbine generator transport (e.g., power generator transport, mobile source of electricity, and the like). The gas turbine generator receives hydrocarbon fuel, such as natural gas, and converts the hydrocarbon fuel into electricity.

As used herein, the term "inlet plenum" may be interchanged and generally referred to as "inlet", "air intake," and "intake plenum," throughout this disclosure. Additionally, the term "exhaust collector" may be interchanged throughout and generally referred to as "exhaust diffuser" and "exhaust plenum" throughout this disclosure.

As used herein, the term "gas turbine inlet filter" may be interchanged and generally referred to as "inlet filter" and "inlet filter assembly." The term "air inlet filter housing" may also be interchanged and generally referred to as "filter housing" and "air filter assembly housing" throughout this disclosure. Furthermore, the term "exhaust stack" may also be interchanged and generally referred to as "turbine exhaust stack" throughout this disclosure.

This disclosure pertains to a mobile source of electricity that may be configured to provide electric power for different applications. The mobile source of electricity may be implemented using one or more transports (e.g., as a two-trailer design). The one or more transports may comprise a power generator transport (e.g., gas turbine generator transport, and the like) that may include a gas turbine and a generator along with other equipment to generate electric power for different applications requiring mobile electric power (e.g., at well sites for hydraulic fracturing). For example, the power generator transport may produce electric power in the ranges of about 15-36 megawatt (MW) when providing electric power to a single well site. The one or more transports may further include an inlet and exhaust transport that may comprise one or more gas turbine inlet air filters and a gas turbine exhaust stack. The power generator transport and the inlet and exhaust transport may be arranged such that the inlet and exhaust are connected at the side of the gas turbine enclosure. Components of both of the power generator transport and the inlet and exhaust transport may also be alternately provided on the same (single) transport to reduce the "footprint" of the mobile source of electricity at a well site. In other embodiments, components of both of the power generator transport and the inlet and exhaust transport may be provided on more than two transports (e.g., three or more trailers) to increase mobility.

Techniques disclosed herein look to improve performance (e.g., power generation efficiency, power output) of the gas turbine generator by implementing a cooling system for the mobile source of electricity. Air density and temperature may directly affect performance of turbine driven power generation equipment. As temperature and/or elevation increase, ambient air density decreases, which in turn may reduce maximum power output of a turbine gas generator. As a result, when operating the mobile source of electricity at elevations higher than sea level (e.g., 5000 feet) and/or in relatively hot ambient environments (e.g., around 110° F.), power generation efficiency of the gas turbine generator may fall below levels (e.g., below gas turbine nameplate output rating) needed for the application at hand (e.g., power hydraulic fracturing equipment).

The cooling system disclosed herein reduces air temperature (e.g., using open cycle or cyclic refrigeration techniques, compression techniques, and the like) of the intake air in the air intake flow path of the turbine on the power generator transport and thereby increases air density to provide more combustion air to the gas turbine for each stroke, and as a result, increases performance of the generator even at elevations higher than sea level and/or in relatively hot ambient environments. In one embodiment, the cooling system may include a heat exchanger apparatus (e.g., finned tubes) which is strategically placed (e.g., on the inlet and exhaust transport) within an air intake flow path and which contains a cooling agent (e.g., liquid nitrogen). A controller of the cooling system may operate a first control valve to feed the cooling agent from a storage tank (e.g., cryogenic vacuum flask) to the heat exchanger apparatus and as the cooling agent warms due to its exposure to the relatively warmer intake air flow, the heat from the intake air is transferred to the cooling agent. This causes the temperature of the intake air to drop, thereby increasing its density as the air is fed to the turbine for combustion, and as a result, increasing the ultimate performance and output power of the gas turbine.

Over time, as the cooling agent warms up, the cooling agent (e.g., liquid nitrogen) may begin to vaporize to a gaseous form and pressure within the heat exchanger apparatus may increase. The controller of the cooling system may operate a second control valve to vent the vaporized cooling agent out of the air intake flow path and into the ambient atmosphere. As the vapor escapes, the controller may operate the first control valve to fill the void space left behind with more cooling agent supplied from the storage tank. In other embodiments, the cooling system may be implemented as a refrigeration cycle-based, or a compressor-based cooling system that generates chilled intake air using a refrigeration cycle or using compressed fluid (e.g., air). Any type of cooling system may be implemented so long as sufficient increase in air density for intake combustion air can be produced.

The mobile source of electricity may be configured to be 'self-sufficient' such that it can be quickly mobilized and de-mobilized without requiring use of external mechanical means or apparatus. For example, after reaching a remote site where the mobile electric power is required, the power generator transport and the inlet and exhaust transport can be quickly converted from a transportation mode to an operational mode by utilizing on-board hydraulics and coupling the inlet and exhaust transport at the side of the gas turbine enclosure. The gas turbine of the power generator transport may then be operated to generate electricity. After the mobile source of electricity is no longer required at the remote site, the power generation transport can be easily mobilized to be in the transportation mode using the on-board hydraulics, without use of any external mechanical apparatus.

The mobile source of electricity may have different applications. For example, the mobile source of electricity may power mobile electric fracturing operations for one or more well sites by providing electric power to a variety of fracturing equipment located at the well sites. The different fracturing equipment, which include, but are not limited to, a blender, hydration unit, sand handling equipment, chemical additive system, cooling system, and the mobile source of electricity, may be configured to operate remotely via a control network system that monitors and controls the fracturing equipment using a network topology, such as an Ethernet ring topology network. The control network system may remove the need for implementing control stations located on and/or in close proximity to the fracturing equipment. Instead, a designated location, such as a data van and/or a remote location away from the vicinity of the fracturing equipment may remotely control the hydraulic fracturing equipment. In other embodiments, the mobile source of electricity (e.g., single-trailer, or multi-trailer design) may be implemented to provide electric power for other applications (e.g., industrial, mining, commercial, civilian, agricultural, manufacturing, and the like) where mobile electric power is needed and where the requisite hydrocarbon fuel required to power the power generator transport is available.

FIG. 1 is a schematic diagram of an embodiment of well site 100 that comprises wellhead 101 and mobile fracturing system 103 (e.g., hydraulic fracturing fleet or system). Generally, mobile fracturing system 103 may perform fracturing operations to complete a well and/or transform a drilled well into a production well. For example, well site 100 may be a site where operators are in the process of drilling and completing a well. Operators may start the well completion process with drilling, running production casing, and cementing within the wellbore. The operators may also insert a variety of downhole tools into the wellbore and/or as part of a tool string used to drill the wellbore. After the operators drill the well to a certain depth, a horizontal portion of the well may also be drilled and subsequently encased in cement. The operators may subsequently remove the rig, and mobile fracturing system 103 may be moved onto well site 100 to perform fracturing operations that force relatively high-pressure fracturing fluid through wellhead 101 into subsurface geological formations to create fissures and cracks within the rock. Fracturing system 103 may be moved off well site 100 once the operators complete fracturing operations. Typically, fracturing operations for well site 100 may last several days.

To provide an environmentally cleaner and more transportable fracturing fleet, mobile fracturing system 103 may comprise mobile source of electricity 102 (e.g., two-trailer system including a power generator transport and inlet and exhaust transport) configured to generate electricity by converting hydrocarbon fuel, such as natural gas, obtained from one or more other sources (e.g., a producing wellhead) at well site 100, from a remote offsite location, and/or another relatively convenient location near mobile source of electricity 102. Improving mobility of mobile fracturing system 103 may be beneficial because fracturing operations at a well site typically last for several days and the fracturing equipment is subsequently removed from the well site after completing fracturing operation. Rather than using fuel that significantly impacts air quality (e.g., diesel fuel) as a source of power and/or receiving electric power from a grid or other type of stationary power generation facility (e.g., located at the well site or offsite), mobile fracturing system 103 utilizes mobile source of electricity 102 as a power source that burns cleaner while being transportable along with other fracturing equipment. The generated electricity from mobile source of electricity 102 may be supplied to fracturing equipment to power fracturing operations at one or more well sites, or to other equipment in various types of applications requiring mobile electric power generation.

As explained previously, mobile source of electricity 102 may be implemented as a single power generator transport in order to reduce the well site footprint and provide the ability for operators to easily move mobile source of electricity 102 to different well sites and/or different fracturing jobs and/or different physical locations. In other embodiments, mobile source of electricity 102 may be implemented using two or more transports. For example, mobile source of electricity 102 may be implemented using a two-transport design in which a first transport may be a power generator transport comprising a turbine (e.g., gas turbine) and a generator, and a second transport may be an inlet and exhaust transport that comprises an air inlet filter housing providing filtered combustion air for the turbine, and an exhaust stack that securely provides an exhaust system for exhaust air from the turbine.

Mobile source of electricity 102 may be operated in environments having relatively high ambient temperatures (e.g., ~110° F.). Alternately, or in addition, mobile source of electricity 102 may be operated in an environment at elevations higher than sea level. In such environments, air density may be lower due to the higher temperature and/or elevations higher than sea level. This, in turn, may cause performance of the gas turbine to be lower than the gas turbine nameplate output rating. To counter the effects of lower air density, a cooling system (See FIGS. 3A-6) may be disposed on or in connection with mobile source of electricity 102 to cool intake combustion air for the gas turbine, so as to increase air density, and thereby increase power output of mobile source of electricity 102.

In addition to mobile source of electricity 102, mobile fracturing system 103 may include switch gear transport 112, at least one blender transport 110, at least one data van 114, and one or more fracturing pump transports 108 that deliver fracturing fluid through wellhead 101 to subsurface geological formations. Switch gear transport 112 may receive electricity generated by power generation transport 102 via one or more electrical connections. In one embodiment, switch gear transport 112 may use 13.8 kilovolts (KV) electrical connections to receive power from power generation transport 102. Switch gear transport 112 may comprise a plurality of electrical disconnect switches, fuses, transformers, and/or circuit protectors to protect the fracturing equipment. The switch gear transport 112 may transfer the electricity received from power generation transport 102 to the electrically connected fracturing equipment of mobile fracturing system 103. Switch gear transport 112 may further comprise a control system to control, monitor, and provide power to the electrically connected fracturing equipment.

In one embodiment, switch gear transport 112 may receive a 13.8 kV electrical connection and step down the voltage to 4.8 kV, which is provided to other fracturing equipment, such as fracturing pump transport 108, blender transport 110, sand storage and conveyor, hydration equipment, chemical equipment, data van 114, lighting equipment, sensor equipment and any additional auxiliary equipment used for the fracturing operations. Switch gear transport 112 may step down the voltage to 4.8 kV rather than other voltage levels, such as 600 V, in order to reduce cable size for the electrical connections and the amount of cabling used to connect mobile fracturing system 103. In another embodiment, the voltage step down operation may be performed further downstream from switch gear transport 112. For example, switch gear transport 112 may provide the received 13.8 kV electrical connection directly to the fracturing pump transport 108. The voltage step down operation may then be performed on fracturing pump transport 108. The control system of switch gear transport 112 may be configured to connect to the control network system (e.g., AI system) such that switch gear transport 112 may be monitored and/or controlled from a distant location, such as data van 114 or some other type of control center.

Fracturing pump transport 108 may receive the electric power from switch gear transport 112 to power a prime mover. The prime mover converts electric power to mechanical power for driving one or more pumps. In one embodiment, the prime mover may be a dual shaft electric motor that drives two different pumps. Fracturing pump transport 108 may be arranged such that one pump is coupled to opposite ends of the dual shaft electric motor and avoids coupling the pumps in series. By avoiding coupling the pump in series, fracturing pump transport 108 may continue to operate when either one of the pumps fails or has been removed from fracturing pump transport 108. Additionally, repairs to the pumps may be performed without disconnecting the system manifolds that connect fracturing pump transport 108 to other fracturing equipment within mobile fracturing system 103 and wellhead 101.

Blender transport 110 may receive electric power fed through switch gear transport 112 to power a plurality of electric blenders. A plurality of prime movers may drive one or more pumps that pump source fluid and blender additives (e.g., sand) into a blending tub, mix the source fluid and blender additives together to form fracturing fluid, and discharge the fracturing fluid to fracturing pump transport 108. In one embodiment, the electric blender may be a dual configuration blender that comprises electric motors for the rotating machinery that are located on a single transport, which is described in more detail in U.S. Pat. No. 9,366,114, filed Apr. 6, 2012 by Todd Coli et al. and entitled "Mobile, Modular, Electrically Powered System for use in Fracturing Underground Formations," which is herein incorporated by reference in its entirety. In another embodiment, a plurality of enclosed mixer hoppers may be used to supply the proppants and additives into a plurality of blending tubs.

Data van 114 may be part of a control network system, where data van 114 acts as a control center configured to monitor and provide operating instructions to remotely operate blender transport 110, mobile source of electricity 102, and fracturing pump transport 108 and/or other fracturing equipment within mobile fracturing system 103. For example, data van 114 may control the cooling system (see FIG. 5) of mobile source of electricity 102 that monitors and controls the temperature of intake combustion air for the gas turbine. Data van 114 controlling the cooling system may further perform predetermined operations or functions based on current power needs of mobile fracturing system 103 as well as based on detected current temperature of intake combustion air for the gas turbine.

Other fracturing equipment shown in FIG. 1, such as fracturing liquid (e.g., water) tanks, chemical storage of chemical additives, hydration unit, sand conveyor, and sandbox storage are known by persons of ordinary skill in the art, and therefore are not discussed in further detail. In one or more embodiments of mobile fracturing system 103, one or more of the other fracturing equipment shown in FIG. 1 may be configured to receive power generated from mobile source of electricity 102. The control network system for mobile fracturing system 103 may remotely synchronize and/or slave the electric blender of blender transport 110 with the electric motors of fracturing pump transports 108. Unlike a conventional diesel-powered blender, the electric blenders may perform rate changes to the pump rate change mounted on fracturing pump transports 108. In other words, if the pumps within fracturing pump transports 108 perform a rate change increase, the electric blender within blender transport 110 may also automatically compensate its rate and ancillary equipment, such as the sand conveyor, to accommodate the rate change. Manual commands from an operator may not be used to perform the rate change.

Mobile source of electricity 102 may be configured to be transportable to different well sites along with other equipment (e.g., fracturing pump transports) that is part of the mobile fracturing system 103 and may not be left behind after completing fracturing operations. Mobile source of electricity 102 may improve mobility by enabling a mobilization and de-mobilization time period of about 32 hours or less. Mobile source of electricity 102 may have a single transport footprint, where the same transport may be used in transportation and operational modes, and be configured as a 'self-sufficient' transport that carries all ancillary equipment for mobile electric power generation. Alternately, mobile source of electricity 102 may have a multi transport footprint including a power generation transport and an inlet and exhaust transport. To provide electric power at one or more locations (e.g., well sites), power generation transport 102 may be designed to unitize and mobilize a gas turbine and a generator adapted to convert hydrocarbon fuel, such as natural gas, into electricity. Although FIGS. 2A-4 illustrate embodiments of mobile source of electricity 102 using two different transports, other embodiments of mobile source of electricity 102 may mount the gas turbine, generator, air inlet filter housing, gas turbine exhaust stack, and other components shown in FIGS. 2A-4 on a different number of transports (e.g., all on one transport, or more than two transports).

FIGS. 2A and 2B are schematic diagrams of an embodiment of gas turbine generator transport 200 (e.g., power generator transport). FIG. 2A illustrates a side-profile view of gas turbine generator transport 200 with turbine enclosure 202 that surrounds components within gas turbine generator transport 200 and includes cavities for inlet plenum 204, exhaust collector 206, and enclosure ventilation inlet 218. FIG. 2B illustrates a side-profile view of gas turbine generator transport 200 that depicts components within turbine enclosure 202. As shown in FIG. 2B, the gas turbine generator transport 200 may comprise the following equipment: (1) inlet plenum 204; (2) gas turbine 207 (e.g., General Electric (GE) Model LM2500); (3) exhaust collector 206; (4) generator 208; (5) generator breaker 210; and (6) control system 212. Other components not specifically identified in FIG. 2B, but which may also be located on gas turbine generator transport 200 include a gas conditioning skid, a black start generator, a gearbox, a generator shaft, a transformer, a starter motor, turbine lube oil system, fire suppression system, and generator lube oil system.

Gas turbine generator transport 200 includes gas turbine 207 to generate mechanical energy (i.e., rotation of a shaft) from a hydrocarbon fuel source, such as natural gas, liquefied natural gas, condensate, and/or other liquid fuels. As shown in FIG. 2B, the gas turbine shaft is connected to generator 208 such that generator 208 converts the supplied mechanical energy from the rotation of the shaft to produce electric power. Gas turbine 207 may be a gas turbine, such as the GE LM2500 family of gas turbines, the Pratt and Whitney FT8 gas turbines, or any other gas turbine that generates enough mechanical power for generator 208 to power fracturing operations at one or more well sites. Generator 208 may be a Brush BDAX 62-170ER generator, or any other generator configured to generate electric power for fracturing operations at one or more well sites. For example, gas turbine 207 and generator 208 combination within gas turbine generator transport 200 may generate electric power from a range of at least about 15 megawatt (MW) to about 35 MW. Other types of gas turbine generators with power ranges greater than about 35 MW or less than about 15 MW may also be used depending on the amount of power needed. In one embodiment, to increase mobility of gas turbine generator transport 200, gas turbine 207 may be configured to fit within a dimension of about 14.5 feet long and about four feet in diameter and/or generator 208 may be configured to fit within a dimension of about 18 feet long and about 7 feet wide.

Generator 208 may be housed within turbine enclosure 202 that includes air ventilation fans internal to generator 208 that draws air into the air inlet located on the front and/or back of generator 208 and discharges air out on the sides via air outlets 214. Other embodiments may have the air outlets positioned on different locations of the enclosure for generator 208. In one embodiment, the air inlet may be inlet louvres and the air outlets may be outlet louvres that protect the generator from the weather elements. A separate generator ventilation stack unit may be mounted on the top of gas turbine generator transport 200.

Turbine enclosure 202 may also comprise gas turbine inlet filter(s) configured to provide ventilation air and combustion air via one or more inlet plenums 204 to gas turbine 207. Additionally, enclosure ventilation inlets 218 may be added to increase the amount of ventilation air. The ventilation air may be air used to cool gas turbine 207 and ventilate gas turbine enclosure 202. The combustion air may be the air that is supplied to gas turbine 207 to aid in the production of the mechanical energy. Inlet plenum 204 may be configured to collect the intake air from the gas turbine inlet filter and supply the intake air to the gas turbine. Exhaust collector 206 may be configured to collect the air exhaust from the gas turbine and supply the exhaust air to the gas turbine exhaust stack.

To improve mobility of gas turbine generator transport 200, the air inlet filter housing and the gas turbine exhaust stack are configured to be connected from at least one of the sides of turbine enclosure 202, as opposed to connecting both the air inlet filter housing and the gas turbine exhaust stack on the top of the turbine enclosure 202 or connecting the air inlet filter housing at one end of the gas turbine generator transport 200 and connecting the exhaust collector from the side or the other end of turbine enclosure 202. The air inlet filter housing and gas turbine exhaust stack from the inlet and exhaust transport may connect with turbine enclosure 202 using one or more expansion connections (e.g., expansion joints) that extend from one or both of the transports, located at the sides of turbine enclosure 202. Any form of connection may be used that provides coupling between turbine enclosure 202 and the air inlet filter housing and gas turbine exhaust stack without using a crane, forklift, and/or any other external mechanical means to connect the expansion connections in place and/or to connect the air inlet filter housing and gas turbine exhaust stack to the side of turbine enclosure 202. The expansion connections (disposed on either or both of transports 200 and 300) may comprise a duct and/or an expansion joint to connect the air inlet filter housing and gas turbine exhaust stack to turbine enclosure 202. Additionally, the routing of the air inlet filter housing and gas turbine exhaust stack via the sides of turbine enclosure 202 may provide a complete aerodynamic modeling where the inlet air flow and the exhaust air flow are used to achieve the gas turbine nameplate output rating. The inlet and exhaust transport is discussed in more detail later in FIGS. 3A and 3B.

To improve mobility over a variety of roadways, gas turbine generator transport 200 in FIGS. 2A and 2B may have a maximum height of about 13 feet and 6 inches, a maximum width of about 8 feet and 6 inches, and a maximum length of about 66 feet. Further, gas turbine generator transport 200 may comprise at least three axles used to support and distribute the weight on gas turbine generator transport 200. Other embodiments of gas turbine generator transport 200 may be transports that exceed three axles depending on the total transport weight. The dimensions and the number of axles may be adjusted to allow for the transport over roadways that typically mandate certain height, length, and weight restrictions.

In one embodiment, gas turbine 207 and generator 208 may be mounted to an engineered transport frame 216, a sub-base, sub-skid, or any other sub-structure used to support the mounting of gas turbine 207 and generator 208. The single engineered transport frame may be used to align the connections between gas turbine 207, generator 208, inlet plenum 204, and exhaust collector 206 and/or lower the gas turbine and generator by configuring for a flush mount to single engineered transport frame 216. Single engineered transport frame 216 may allow for easier alignment and connection of gas turbine 207 and generator 208 compared to using separate sub-base for gas turbine 207 and generator 208. Other embodiments of gas turbine generator transport 200 may use a plurality of sub-bases, for example, mounting gas turbine 207 on one sub-base and mounting generator 208 on another sub-base.

Figure 5:
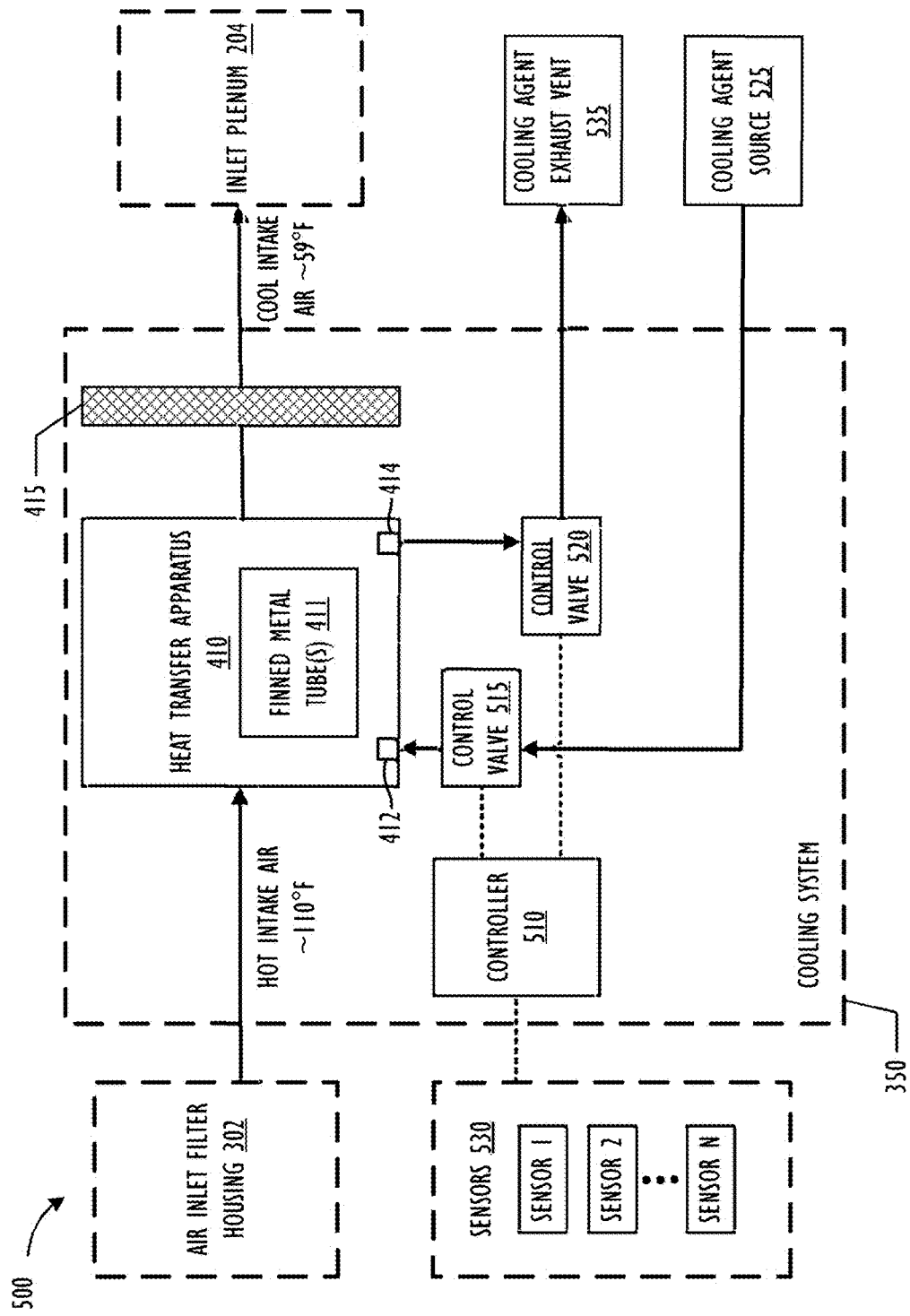
FIG. 5 is a block diagram of the cooling system, in accordance with one or more embodiments.

FIG. 2B illustrates that generator breaker 210 and control system 212 may be located on gas turbine generator transport 200. Generator breaker 210 may comprise one or more circuit breakers that are configured to protect generator 208 from current and/or voltage fault conditions. Generator breaker 210 may be a medium voltage (MV) circuit breaker switchboard. In one embodiment, generator breaker 210 may be about three panels, two for generator 208 and one for a feeder that protect relays on the circuit breaker. In one embodiment, generator breaker 210 may be vacuum circuit breaker. Control system 212 may be configured to control, monitor, regulate, and adjust the power output of gas turbine 207 and generator 208. For example, control system 212 may monitor and balance the load produced by the fracturing operations by generating enough electric power to match the load demands. In one embodiment, control system 212 may control a controller (510; FIG. 5) for the cooling system (350; FIG. 5) of mobile source of electricity 102 (as described in FIG. 5), to control temperature of inlet combustion air in order to increase electric power generated by gas turbine 207 and generator 208 based on load demands. Control system 212 may also be configured to synchronize and communicate with a control network system that allows a data van or other computing systems located in a remote location (e.g., off the well site) to control, monitor, regulate, and adjust power output of generator 208. Although FIG. 2B illustrates that generator breaker 210 and/or control system 212 may be mounted on gas turbine generator transport 200, other embodiments of mobile source of electricity 102 may mount generator breaker 210 and/or control system 212 in other locations (e.g. switch gear transport).

Other equipment that may also be located on gas turbine generator transport 200, but are not shown in FIGS. 2A and 2B include the turbine lube oil system, gas fuel valves, generator lube oil system, and fire suppression system. The lube oil systems or consoles, which generally refer to both the turbine lube oil system and generator lube oil system within this disclosure, may be configured to provide a generator and turbine lube oil filtering and cooling systems. In one embodiment, the turbine lube oil console area of the transport may also contain the fire suppression system, which may comprise sprinklers, water mist, clean agent, foam sprinkler, carbon dioxide, and/or other equipment used to suppress a fire or provide fire protection for gas turbine 207. The mounting of the turbine lube oil consoles and the fire suppression system onto gas turbine generator transport 200 reduces this transport's footprint by eliminating the need for an auxiliary transport and connections for the turbine and generator lube oil, filtering, cooling systems and the fire suppression system to gas turbine generator transport 200. The turbine and generator lube oil systems may be mounted on a skid that is located underneath generator 208 or any other location on gas turbine generator transport 200.

FIGS. 3A and 3B are schematic diagrams of embodiments of inlet and exhaust transport 300. Specifically, FIG. 3A depicts inlet and exhaust transport 300 while in transportation mode and FIG. 3B depicts inlet and exhaust transport 300 while in operational mode. As shown in FIGS. 3A and 3B, inlet and exhaust transport 300 includes air inlet filter housing 302 and gas turbine exhaust stack 304. Although not shown in FIGS. 3A and 3B, one or more gas turbine inlet filters and ventilation fans may be located within or housed in the air inlet filter housing 302.

Air inlet filter housing 302 may be mounted on inlet and exhaust transport 300 at a fixed location. Alternately, as shown in FIG. 3B, inlet and exhaust transport 300 may mount air inlet filter housing 302 with a configuration such that air inlet filter housing 302 may slide in one or more directions when transitioning between operational mode and transportation mode. For example, as shown in FIG. 3B, air inlet filter housing 302 may slide out for operational mode and slide back for transport mode. Sliding air inlet filter housing 302 may be used to align air inlet filter housing 302 with inlet plenum 204 of gas turbine enclosure 202 mounted on gas turbine generator transport 200. In another embodiment (not shown), air inlet filter housing 302 may be mounted on a turntable with the ability to engage inlet plenum 204 of gas turbine enclosure 202 mounted on gas turbine generator transport 200. Air inlet filter housing 302 may comprise a plurality of silencers (not shown) that reduce noise. The different embodiments for mounting air inlet filter housing 302 may depend on the amount of clean air and the air flow dynamics needed to supply air to gas turbine 207 for combustion. As shown in FIGS. 3A-3B, air inlet filter housing 302 includes cooling system 350 configured to cool intake air for combustion by gas turbine 207 mounted on gas turbine generator transport 200. Configuration of cooling system 350 is explained in further detain in connection with FIGS. 4-6.

Gas turbine exhaust stack 304 may comprise gas turbine exhaust 308, exhaust extension 306 configured for noise control, and exhaust end connector 310. Exhaust extension 306 may comprise a plurality of silencers that reduce noise from inlet and exhaust transport 300. As shown in FIG. 3A, gas turbine exhaust stack 304 may be mounted to initially lie on its side during transportation mode. In operational mode, gas turbine exhaust stack 304 may be rotated up without using external mechanical means such that gas turbine exhaust stack 304 is mounted to inlet and exhaust transport 300 on its base and in the upright position. In the operational mode, gas turbine exhaust stack 304 may be positioned using hydraulics, pneumatics, and/or electric motors such that it aligns and connects with exhaust end connector 310, which in turn connects with exhaust collector 206 of gas turbine enclosure 202 shown in FIGS. 2A and 2B.

Exhaust end connector 310 may be adjusted to accommodate and align gas turbine exhaust stack 304 with exhaust collector 206 of gas turbine enclosure 202. In operational mode, exhaust end connector 310 may move forward in a side direction, which is in the direction toward gas turbine enclosure 202. Exhaust end connector 310 may move backward in the side direction, which is in the direction away from gas turbine enclosure 202, when transitioning to the transportation mode. Other embodiments of gas turbine exhaust stack 304 may have gas turbine exhaust 308 and exhaust end connector 310 connected as a single component such that exhaust end connector 310 and gas turbine exhaust stack 304 are rotated together when transitioning between the transportation and operational modes.

In another embodiment, during transport, gas turbine exhaust stack 304 may be sectioned into a first section and a second section. For example, the first section may correspond to gas turbine exhaust 308 and the second section may correspond to the exhaust extension 306. The first section 308 of gas turbine exhaust stack 304 may be in the upright position and the second section 306 of gas turbine exhaust stack 304 may be mounted adjacent to the first section of gas turbine exhaust for transport. The first section and the second section may be hinged together such that the second section may be rotated up to stack on top of the first section for operation. In another embodiment, gas turbine exhaust stack 304 may be configured such that the entire gas turbine exhaust stack 304 may be lowered or raised while mounted on inlet and exhaust transport 300.

Typically, air inlet filter housing 302 and gas turbine exhaust stack 304 may be transported on separate transports and subsequently crane lifted onto the top of gas turbine enclosure and mounted on the gas turbine generator transport during operation mode. The separate transports to carry air inlet filter housing 302 and gas turbine exhaust stack 304 may not be used during operational mode. However, by adapting air inlet filter housing 302 and gas turbine exhaust stack 304 to be mounted on a single transport and to connect to at least one of the sides of gas turbine enclosure 202 mounted on gas turbine generator transport 200, inlet and exhaust transport 300 may be positioned alongside gas turbine generator transport 200 and subsequently connect the air inlet and exhaust plenums for operations. The result is having a relatively quick rig-up and/or rig-down that eliminates the use of heavy lift cranes, forklifts, and/or any other external mechanical means at the operational site.

FIG. 4 is a schematic diagram of an embodiment of the two-transport mobile electric power source 400 (e.g., mobile source of electricity) when in operational mode. FIG. 4 illustrates a top-down-view of the coupling between inlet and exhaust transport 300 and gas turbine generator transport 200 during operational mode. Exhaust expansion connection 402 may be disposed on one or both of gas turbine generator transport 200 and inlet and exhaust transport 300 and may move and connect (e.g., using hydraulics) exhaust end connector 310 of inlet and exhaust transport 300 with exhaust collector 206 of gas turbine generator transport 200 without using external mechanical means. At least one inlet expansion connection 404 may similarly be disposed on one or both of gas turbine generator transport 200 and inlet and exhaust transport 300 and may move and connect air inlet filter housing 302 of inlet and exhaust transport 300 with inlet plenum 204 of gas turbine generator transport 200. Expansion connection 404 may also provide ventilation air from air inlet filter housing 302 of inlet and exhaust transport 300 via ventilation inlet 218 to enclosure 202 of gas turbine generator transport 200.

The two transports 200 and 300 may be parked at a predetermined orientation and distance such that exhaust expansion connection 402 and inlet expansion connections 404 are able to connect the two transports 200 and 300 to each other. In one embodiment, to adjust the positioning, alignment, and distance in order to connect the two transports 200 and 300, each of the transports 200 and 300 may include a hydraulic walking system. For example, the hydraulic walking system may move and align transport 300 into a position without attaching the two transports 200 and 300 to transportation vehicles (e.g., a tractor or other type of motor vehicle). Using FIGS. 2A-2B and 3A-3B as an example, the hydraulic walking system may comprise a plurality of outriggers and/or support feet 212 used to move transport 200 and/or transport 300 back and forth and/or sideways. At each outrigger and/or support feet 212, the hydraulic walking system may comprise a first hydraulic cylinder that lifts the transport and a second hydraulic cylinder that moves the transport in the designated orientation or direction. A hydraulic walking system on the transport increases mobility by reducing the precision needed when parking the two transports next to each other.

As explained previously, when operating gas turbine generator transport 200 and inlet and exhaust transport 300 in the operational mode in high elevation environments (e.g., elevations higher than sea level) and/or in environments with high ambient temperature (e.g., during hot summer season), power output of the gas turbine may fall below levels (e.g., below gas turbine nameplate output rating) needed for the application at hand (e.g., power hydraulic fracturing equipment). In this case, a controller may operate cooling system 350 associated with transports 200 and 300 to cool intake combustion air to increase the power output of the gas turbine.

FIG. 5 shows block diagram 500 of cooling system 350, in accordance with one or more embodiments. In general and as noted previously, cooling system 350 is incorporated into the components for handling intake air into an intake of mobile turbine 207 generating electricity. Namely, cooling system 350 is incorporated into air inlet filter housing 302 on inlet and exhaust transport 300. Cooling system 350 includes heat transfer apparatus 410, controller 510, and one or more sensors 530. If necessary, cooling system 350 may also include filter bank 415, as described later.

Heat transfer apparatus 410 can include one or more heat exchangers or finned metal tube coils (e.g., finned metal tube(s) 411 in FIG. 5) having one or more inlets 412 and outlets 414 for communication of a cooling agent through heat transfer apparatus 410. In turn, heat transfer apparatus 410 absorbs heat from the ambient air passing through apparatus 410 to produce the cooled intake air for the intake (i.e., inlet plenum 204) of mobile turbine 207. To monitor operation, the one or more sensors 530 sense at least one property associated with cooling system 350. For example and as described in more detail below, the at least one sensed property associated with the system can include the temperature of the ambient air, the elevation of the mobile turbine, the pressure level and/or temperature of the cooling agent in heat transfer apparatus 410, the temperature of the intake air entering inlet plenum 204, the current power output from the mobile turbine, and a load demand metric associated with the mobile turbine, etc. In turn, controller 510 in communication with the one or more sensors 530 is operable to control the absorption of heat from the ambient air (and in turn control the output temperature of the intake air) by regulating the communication of the cooling agent through heat transfer apparatus 410 based on the at least one sensed property.

As shown in FIG. 5, cooling system 350 is configured to cool ambient air entering air inlet filter housing 302 by causing the ambient air to come in contact with heat transfer apparatus 410 and flow cooled air to inlet plenum 204 of gas turbine 207 disposed on power generator transport 200 as combustion air. Because cooler air is denser, inputting air for combustion that has been cooled by cooling system 350 to a temperature lower than ambient air temperature improves relative power generation performance of gas turbine 207, and thereby increases the electric power output of generator 208. For example, when operating power generator transport 200 (having a nameplate rating (e.g., International Standards Organization (ISO) rating) of about 35 MW) and inlet and exhaust transport 300 at an elevation of about 5000 feet above sea level and/or when ambient operating temperature (i.e., temperature of inlet air) is about 90° F., operating cooling system 350 to cool intake combustion air to about 59° F. may result in a gain of about 3.5 MW of power output from power generator transport 200. In case the ambient operating temperature is about 115° F., operating cooling system 350 to cool intake combustion air to about 59° F. may result in a gain of about 6 to 7 MW of power output from power generator transport 200. In other words, operating cooling system 350 as disclosed herein to cool inlet air for combustion by power generator transport 200 to about 59° F. may result in a gain of about 10-20% of the total power output, depending on ambient operating conditions.

As shown in FIG. 5, cooling system 350 may be implemented as a non-cyclic (or open cycle) refrigeration system in which heat transfer apparatus 410 is disposed in an air intake flow path between air inlet filter housing 302 and inlet plenum 204. Heat transfer apparatus 410 may be configured to efficiently transfer heat from ambient air flowing in the air intake flow path to a cooling agent contained in heat transfer apparatus 410. The cooling agent may be any fluid (or solid) that has a temperature lower than ambient air temperature and that can act as a heat sink. Non-limiting examples of fluids that can be used as a cooling agent may include liquid nitrogen, other cryogenic fluids, or other liquids and/or gases derived from solids like dry ice, ice, and the like. The cooling agent may be stored in cooling agent source 525, such as a storage tank, vacuum flask, tanker truck, and the like, and may be provided to heat transfer apparatus 410 via insulated pipes and a pump (not shown) or other apparatus through control valve 515.

Heat transfer apparatus 410 may comprise one or more finned metal tubes (e.g., bundle or coil of finned metal tubes, heat exchanger, and the like) that are disposed in the air intake flow path to contact flowing intake air and to dissipate (absorb) heat effectively, thereby rapidly cooling the intake air over a large surface area. Location, shape, arrangement or specific configuration of heat transfer apparatus 410 is not particularly limited so long as heat transfer apparatus 410 is strategically disposed on a flow path of inlet air that enters air inlet filter housing 302 from the ambient environment and flows to gas turbine 207 via inlet plenum 204 of power generator transport 200 and heat transfer apparatus 410 achieves a desired drop in intake air temperature during the time from when the intake air enters air inlet filter housing 302 at the upstream end of the air intake flow path to when the intake air exits the air intake flow path upon entry into turbine 207. For example, heat transfer apparatus 410 may be disposed at one or more locations in the air intake flow path so that the surface contact area between ambient air entering air inlet filter housing 302 and heat transfer apparatus 410 is sufficient to achieve the desired drop in air temperature.

In one embodiment, as shown in FIG. 4, heat transfer apparatus 410 may be disposed within air inlet filter housing 302 of inlet and exhaust transport 300 to cool inlet air for combustion by gas turbine 207 mounted on gas turbine generator transport 200 and cool inlet air for ventilating gas turbine enclosure 202 and cooling gas turbine 207. For example, as shown in FIG. 4, heat transfer apparatus 410 (e.g., coil or bundle of finned tubes, heat exchanger) may be arranged at one or more locations along one or more internal peripheral surfaces of an enclosure of air inlet filter housing 302. That is, heat transfer apparatus 410 may be provided along on one or more walls of air inlet filter housing 302 where gas turbine (and ventilation) inlet filters are disposed. Total surface area, shape, size, location, and other features of heat transfer apparatus 410 may be configured so that a desired drop in temperature can be achieved and depending on the amount of cooled air and the air flow dynamics needed to supply the cooled air to gas turbine 207 for combustion.

Figure 8:
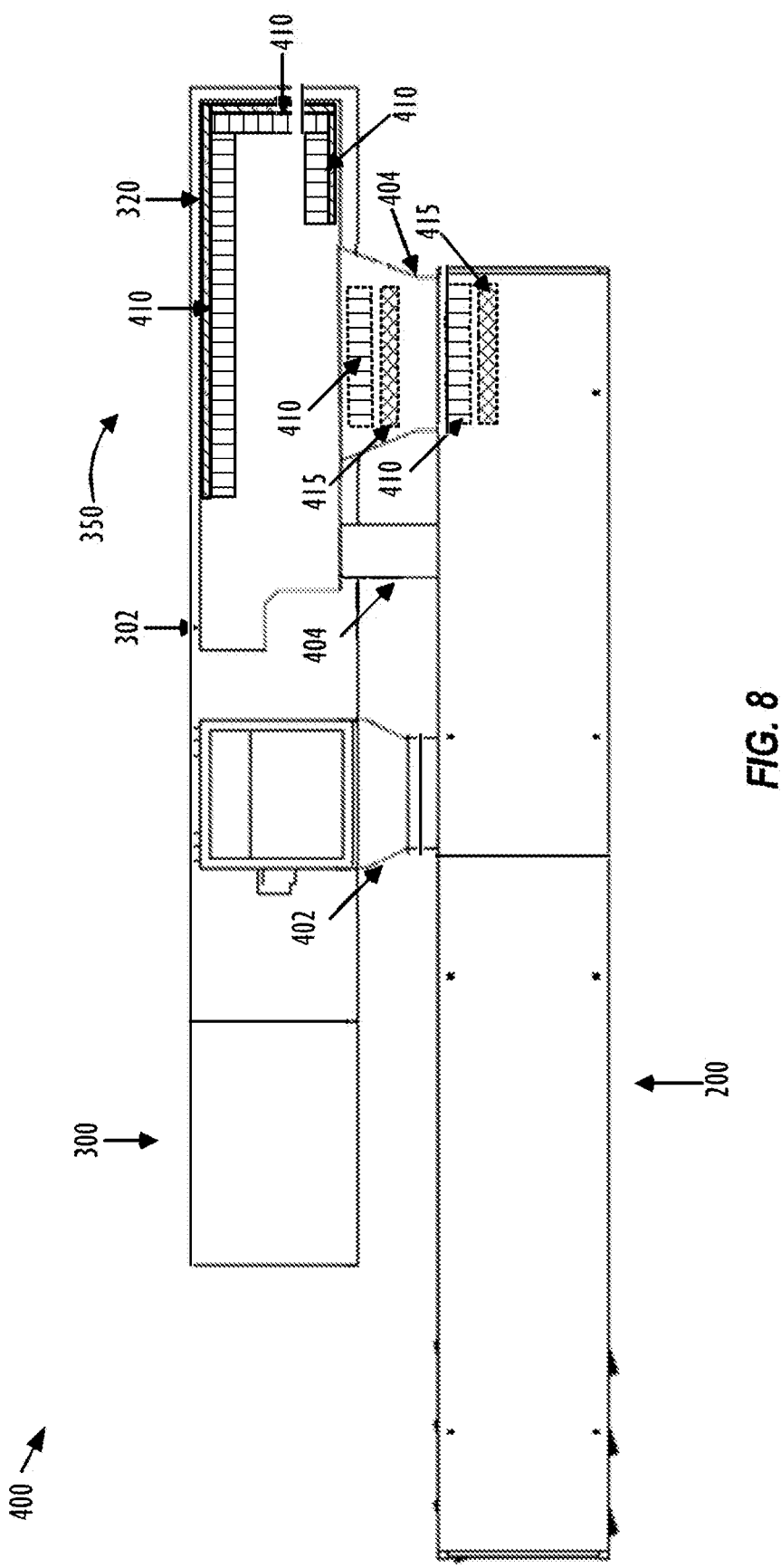
FIG. 8 is a schematic diagram of an embodiment of the two-transport mobile electric power source when in operational mode.

As schematically shown in FIG. 4, air inlet housing 302 includes one or more filters 320 for filtering the ambient air before it enters the turbine's inlet plenum 204 of turbine enclosure 202. Heat transfer apparatus 410 can be housed in air inlet filter housing 302 downstream of filters 320. Although FIG. 4 shows heat transfer apparatus 410 to be housed within air inlet filter housing 302, this may not necessarily be the case. For example, heat transfer apparatus 410 may alternately (or additionally) be disposed in one or more of expansion connections 404, (e.g., as shown in FIG. 8), other components of inlet and exhaust transport 300, inlet plenum 204, other component of gas turbine generator transport 200, or on a transport other than gas turbine generator transport 200 and inlet and exhaust transport 300. Moreover, heat transfer apparatus 410 may be disposed outside air inlet filter housing 302, either being attached outside housing 302 or being housed in a separate enclosure connected to housing 302. That is, as shown by way of example in FIG. 8, heat transfer apparatus 410 may be disposed at any point (or at more than one point) of the air intake flow path of gas turbine 207 so that the requisite surface area contact between heat transfer apparatus 410 and ambient air being flown for combustion is achieved.

Returning to FIG. 5, sensors 530 (e.g., Sensor 1, Sensor 2, . . . . Sensor N) may include a plurality of types of sensors, including temperature sensor, humidity sensor, pressure sensor, altitude sensor, and the like. Sensors 530 may be disposed at different locations of cooling system 350 and configured to detect (e.g., sense) sensor data of ambient temperature, humidity level, etc. of inlet air flowing into air inlet filter housing 302 before the inlet air has come into contact with heat transfer apparatus 410 (e.g., at an upstream end of the air intake flow path), and ambient temperature, humidity level, etc. of inlet air flowing out of cooling system 350 after the inlet air has been cooled by contact with heat transfer apparatus 410 (e.g., at a downstream end of the air intake flow path). Sensors 530 may further include a sensor to detect temperature of the cooling agent in heat transfer apparatus 410, a sensor to detect pressure level of vaporized cooling agent fed into heat transfer apparatus 410, a sensor to detect elevation of the mobile source of electricity, a sensor to detect current power output from the mobile source of electricity, a sensor to detect a load demand metric associated with the mobile source of electricity, and the like. Controller 510 of cooling system 350 may be configured to receive sensor data from sensors 530. The number, type, position, angle, and other characteristics of sensors 530 are not intended to be limiting, and may be determined so that cooling system 350 can effectively cool intake air to the required temperature in the air intake flow path.

Controller 510 of cooling system 350 may be configured to operate control valves 515 and 520 in fluid communication with heat transfer apparatus 410 based on sensor data received from one or more of sensors 530, and regulate the heat transfer operation performed by heat transfer apparatus 410 so as to produce a desired cooling effect for inlet air under current ambient environment conditions. For example, while power generator transport 200 is in the operational mode and when additional power output is desired based on current environmental conditions (e.g., high elevation environment and/or high ambient temperature environment) or current load conditions detected by sensors 530, controller 510 may (automatically or based on user operation) operate control valve 515 to feed a desired amount of the cooling agent from cooling agent source 525 to heat transfer apparatus 410 via insulated pipes so that inlet air comes into contact with the heat transfer apparatus 410 being cooled by the cooling agent. As the cooling agent within heat transfer apparatus 410 warms due to its exposure to the relatively warmer intake air flow, heat from the intake air is transferred to the cooling agent. This causes the temperature of the intake air to drop, thereby increasing its density and increasing the power output of gas turbine 207 and generator 208.

Over time, as the cooling agent warms up (as detected by one or more of sensors 530), the cooling agent may begin to vaporize to a gaseous form and pressure within the heat transfer apparatus 410 may increase. Controller 510 of cooling system 350 may detect this increase in pressure and temperature of cooling agent within heat transfer apparatus 410 via one or more corresponding sensors 530 associated with heat transfer apparatus 410. When predetermined conditions or thresholds of pressure and temperature (e.g., predetermined properties) of the cooling agent within apparatus 410 are satisfied, controller 510 may (automatically or based on user operation) operate control valve 520 to vent the vaporized cooling agent at a desired rate out of the air intake flow path and into the ambient atmosphere by feeding heated and vaporized cooling agent to cooling agent exhaust vent 535 via one or more pipes.

In one embodiment, exhaust vent 535 may be disposed such that vaporized cooling agent may be safely released into the ambient air without any danger to the environment, operating personnel, equipment, and/or operation of power generator transport 200. As the vapor escapes from heat transfer apparatus 410, controller 510 may operate control valve 515 to fill the void space left behind with more cooling agent supplied from storage tank 525 at a desired rate set by control valve 515. Based on sensor data received from sensors 530, and by operating control valves 515 and 520, controller 510 may continuously monitor, control, and regulate temperature of intake air that is output from cooling system 350 (e.g., at the downstream end of the air intake flow path) and into inlet plenum 204, so that the intake air flowing into gas turbine 207 has a desired target temperature (e.g., around 59° F.) regardless of current ambient environment temperature and elevation conditions. Persons having ordinary skill in the art will appreciate that one or more components of cooling system 530 (e.g., cooling agent source 525, heat transfer apparatus 410, control valves 515 and 520, connecting pipes, cooling agent exhaust vent 535, sensors 530, and the like) may be made with material (e.g., metal) that is able to withstand low temperatures of the cooling agent (e.g., liquid nitrogen), which may range from about −346° F. and −320° F.

In the embodiment described above in connection with FIGS. 4 and 5, cooling system 350 is implemented as an open cycle (or non-cyclic) refrigeration system where a cooling agent (e.g., liquid nitrogen) is fed into heat transfer apparatus 410 (e.g., heat exchanger having finned tube coils) to cool inlet air, cooling agent that is heated and vaporized by absorbing heat from ambient air is released into the ambient environment from exhaust vent 535, and more cooling agent is supplied from source 525 to fill the void created in heat transfer apparatus 410 by release of vaporized cooling agent from exhaust vent 535. However, cooling system 350 is not necessarily limited to such an open cycle system and can instead include a closed cycle system in which components to recapture and cycle the cooling agent are installed.

In another embodiment, for example, cooling system 350 may be implemented as a refrigeration cycle-based cooling system that generates chilled intake air using a refrigeration cycle. In such a refrigeration cycle, a circulating working fluid (e.g., refrigerant like R-22) enters a compressor (not shown) as a vapor. The vapor is compressed at constant entropy and exits the compressor superheated. The superheated vapor travels through a condenser (not shown) which first cools and removes the superheat and then condenses the vapor into a liquid by removing additional heat at constant pressure and temperature. The liquid refrigerant goes through an expansion valve (also called a throttle valve) where its pressure abruptly decreases, causing flash evaporation and auto-refrigeration of, typically, less than half of the liquid. That results in a mixture of liquid and vapor at a lower temperature and pressure. The cold liquid-vapor mixture then travels through the evaporator coil or tubes (e.g., heat transfer apparatus 410) and is completely vaporized by cooling the warm ambient inlet air in the air intake flow path of gas turbine 207. The resulting refrigerant vapor returns to the compressor inlet to complete the refrigeration cycle.

In yet another embodiment, cooling system 350 may be implemented as a compression/decompression-based system that uses compressed fluid (e.g., air) to cool ambient air. For example, cooling system 350 may employ a pneumatic tank that can be pressurized overnight or during times when ambient temperature is cooler or there is excess power available on site. A cooling effect can then be generated by releasing the pressure from the pressurized pneumatic tank via heat transfer apparatus 410 (e.g., coil or series of finned metal tubes) that is in surface contact with warmer intake air in the air intake flow path. For example, for every 15 PSI of pressure bled off from the pneumatic tank, heat transfer apparatus 410 may cause about a 1° F. drop in temperature of ambient air. Cooling system 350 may also be implemented using other types of refrigeration systems so long as sufficient increase in air density (and reduction in air temperature) for combustion air intake can be produced.

When cooling system 350 is implemented as the compression/decompression-based system, the compressed air may also directly be used as combustion air for gas turbine 207. For example, utilizing power from the turbine generator during off-peak times, a compressor can pressurize air tanks with ambient surrounding air. Pressurized air from these air tanks could be discharged at any time, as needed. As explained above, a cooling effect can be generated as the compressed air is discharged from the air tanks, causing a significant drop in temperature of the discharged air, as the pressure decreases. This decompressed, cooled air can be directly fed to gas turbine 207 as part of the intake air in the air intake flow path. The decompressed, cooled air could be anywhere between 0%-100% of the inlet/combustion air stream, fed to inlet plenum 204 intermingled with (warmer) ambient combustion air in the air intake flow path.

Further, when operating cooling system 350 to cool intake air for gas turbine 207 in the operational mode, any humidity in the ambient inlet air that comes in contact with an outer surface (e.g., coil of finned metal tubes) of heat transfer apparatus 410 may freeze and cause ice formations in the air intake flow path on the outer surface of heat transfer apparatus 410 or in nearby vicinity. Over time, chunks of ice formed in the flow path may come off and fly into inlet plenum 204 of gas turbine 207. As expected, this could cause severe damage to the fan blades of gas turbine 207 operating at high speeds. To prevent damage to the turbine, as shown in FIGS. 4 and 5, cooling system 350 may include filter bank 415 including one or more filters (e.g., fog screens) designed to prevent damage to turbine 207 from debris (e.g., ice) flying into inlet plenum 204. The aperture size of filter bank 415 may be configured so as to prevent pieces of debris having dimensions larger than a predetermined size from flying into gas turbine 207 and depending on the amount of cooled air and the air flow dynamics needed to supply the cooled air to gas turbine 207 for combustion.

Filter bank 415 may be provided at one or more points along the air intake flow path from air inlet filter housing 302 to inlet plenum 204. As shown in FIG. 4, filter bank 415 may be provided within one or both of inlet expansion connections 404 disposed between air inlet filter housing 302 of inlet and exhaust transport 300 and inlet plenum 204 of gas turbine generator transport 200 so as to be disposed downstream of heat transfer apparatus 410 in the air intake flow path.

Figure 7:
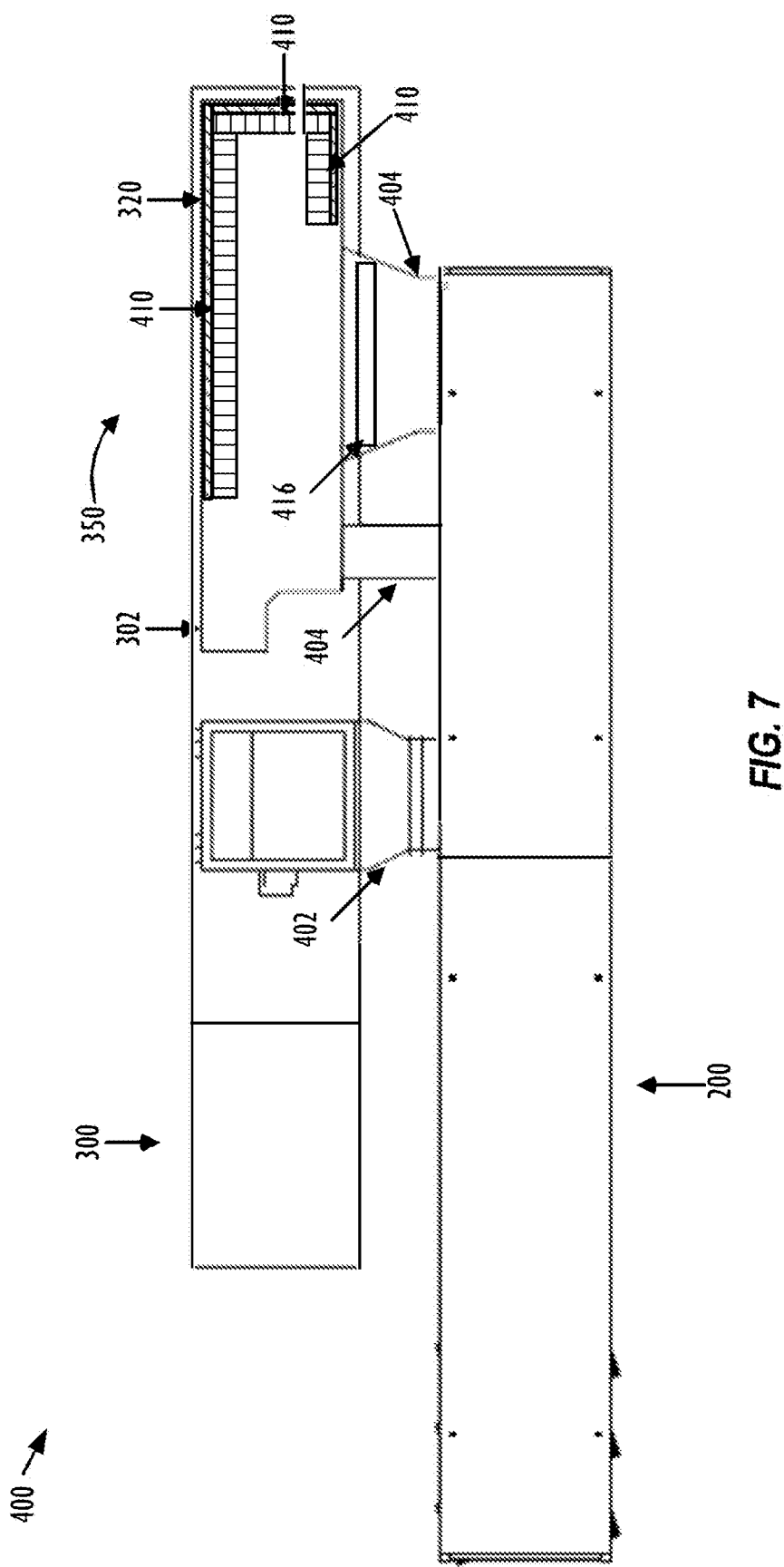
FIG. 7 is a schematic diagram of an embodiment of the two-transport mobile electric power source when in operational mode.

Although FIG. 4 illustrates filter bank 415 being disposed in inlet expansion connection 404, this may not necessarily be the case. For example, filter bank 415 may be disposed along an outer or inner periphery of an enclosure of air inlet filter housing 302. Alternately (or additionally) filter bank 415 be disposed in one or more of air inlet filter housing 302, other component of inlet and exhaust transport 300, inlet plenum 204, other component of gas turbine generator transport 200, or on a transport other than gas turbine generator transport 200 and inlet and exhaust transport 300. That is, as shown by way of example in FIG. 8, filter bank 415 may be disposed at any point (or at more than one point) of the air intake flow path for inlet plenum 204 of gas turbine 207, so that the debris or ice can be prevented from flying into gas turbine 207. Instead of, or in addition to, providing filter bank 415 to prevent debris or ice from flying into gas turbine 207, cooling system 350 may include in the air intake flow path one or more gravity driven passageways (e.g., 416 in FIG. 7) with which debris or ice is prevented from entering gas turbine 207 by an act of gravity.

Figure 6:
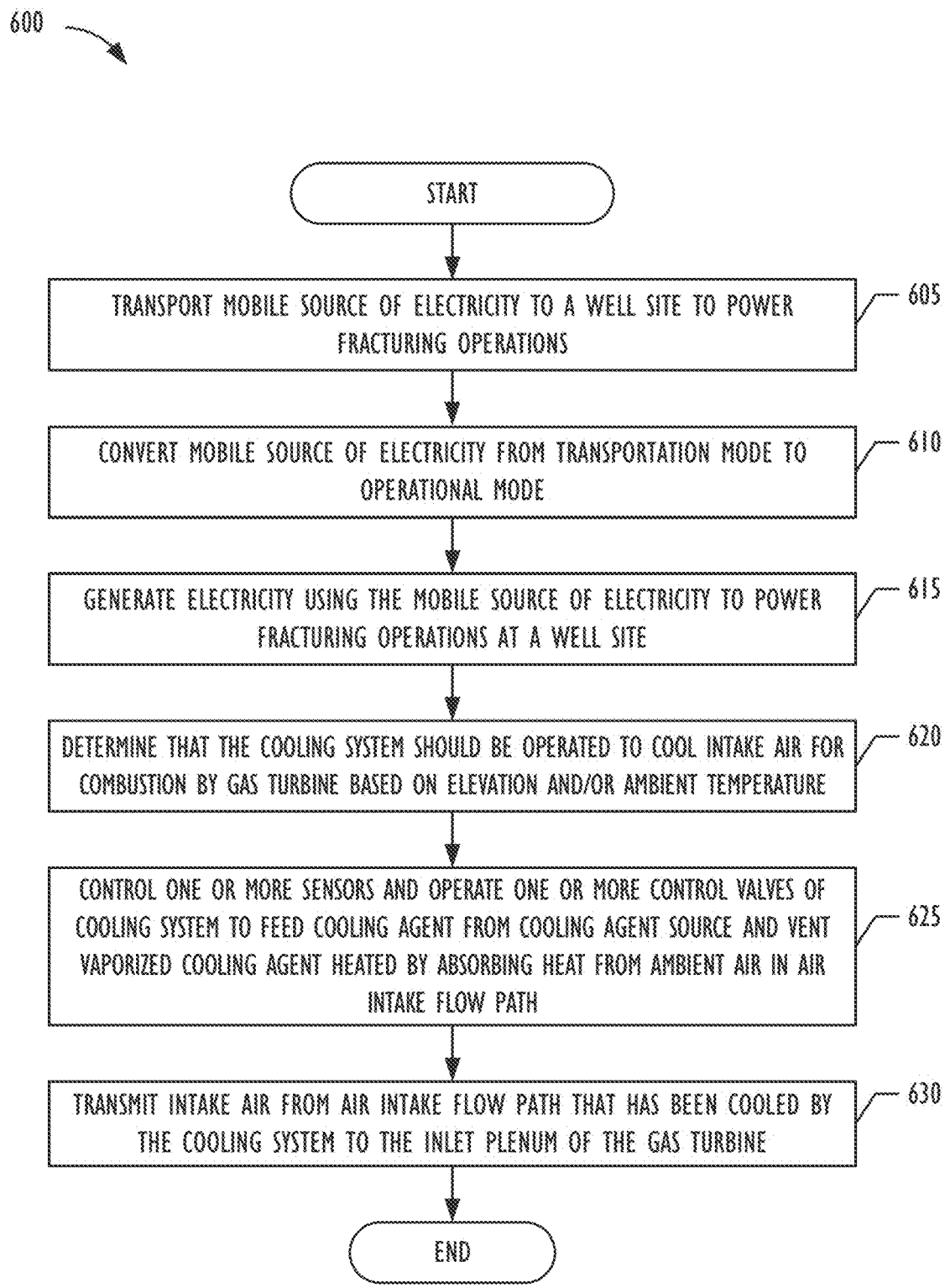
FIG. 6 is a flow chart of an embodiment of a method to cool intake air for combustion at the power generator transport.

FIG. 6 is a flow chart of an embodiment of a method 600 to cool intake air for combustion at the power generator transport. Method 600 may start at block 605 by transporting a mobile source of electricity with other fracturing equipment to a well site that comprises a non-producing well. As explained previously, the mobile source of electricity may also be used for other applications where power generation is needed at a remote (e.g., "off-the-grid") location. Method 600 may then move to block 610 and convert the mobile source of electricity from transportation mode to operational mode. The same transports may be used during the conversion from transportation mode to operational mode. In other words, transports are not added and/or removed when setting up the mobile source of electricity for operational mode. Additionally, method 600 may be performed without the use of a forklift, crane, and/or other external mechanical means to transition the mobile source of electricity into operational mode. The conversion process for a two-transport trailer is described in more detail in FIGS. 2A-4.

Method 600 may then move to block 615 and generate electricity using the mobile source of electricity to power fracturing operations at the well site. In one embodiment, method 600 may generate electricity by converting hydrocarbon fuel into electricity using a gas turbine generator. As explained previously, the remote location where power generation by the mobile source of electricity is required for a particular application (e.g., hydraulic fracturing at a well site) may be in an elevated (e.g., above sea level) environment and/or in an environment having a high ambient temperature. As also explained previously, such an environment may affect the power generation capacity of the gas turbine due to the reduced air density.

To compensate (or to provide additional power output) for the negative effects on total power output caused by the reduced air density, method 600 may, at block 620, determine that a cooling system provided in association with the mobile source of electricity should be operated to cool intake air for combustion by the gas turbine located on the power generator transport. Cooling intake air may cause an increase in the air density that is fed into the turbine, thereby causing an increase in the total power output. Method may then move to block 625 where the controller of the cooling system may obtain sensor data from one or more sensors and operate one or more control valves to feed cooling agent into a heat transfer apparatus of the cooling system to cool air as it flows through the air intake flow path and into the intake of the gas turbine of the power generator transport. Detailed operation of the cooling system is explained in connection with FIGS. 4 and 5. Method 600 may then move to block 630 and transmit intake air which has been cooled by the cooling system to the inlet of the gas turbine for combustion. The cooled intake air being denser, causes an increase in power generation output of the gas turbine.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations may be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). The use of the term "about" means ±10% of the subsequent number, unless otherwise stated.

Use of the term "optionally" with respect to any element of a claim means that the element is required, or alternatively, the element is not required, both alternatives being within the scope of the claim. Use of broader terms such as comprises, includes, and having may be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise.

Many other embodiments will be apparent to those of skill in the art upon reviewing the above description. The scope of the subject matter of the present disclosure therefore should be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A system for cooling intake air, the system comprising:
a heat transfer apparatus for absorbing heat from ambient air and outputting cooled air;
a first transport including an air inlet filter housing that intakes the cooled air from the heat transfer apparatus, filters the cooled air, and outputs the filtered air from a combustion air connection;
a second transport including a gas turbine, the gas turbine having an intake connected to an inlet plenum;
wherein, in an operation mode, the combustion air connection of the first transport is connected to the inlet plenum of the second transport between a facing side of the first transport and a facing side of the second transport; and
one of: (i) a gravity driven passageway in the combustion air connection, the gravity driven passageway preventing debris or ice from entering the intake of the gas turbine by an act of gravity, (ii) a filter disposed in the combustion air connection, the filter filtering the cooled air output from the air inlet filter housing, or (iii) a filter disposed on the second transport upstream of the intake of the gas turbine, the filter filtering the cooled air received from the combustion air connection of the first transport.

2. The system of claim 1, further comprising:
a filter disposed on the first transport upstream of the combustion air connection and inside the air inlet filter housing, the filter filtering the cooled air received from the heat transfer apparatus.

3. The system of claim 1, wherein the heat transfer apparatus includes finned metal tubes and a cooling agent flows through the finned metal tubes of the heat transfer apparatus, wherein the heat transfer apparatus absorbs the heat from the ambient air and outputs the cooled air by causing the ambient air to come into contact with external surfaces of the finned metal tubes.

4. The system of claim 3, wherein the cooling agent is liquid nitrogen.

5. The system of claim 3, wherein the cooling agent is fed into the finned metal tubes from a cooling agent source and wherein after flowing through the finned metal tubes of the heat transfer apparatus, the cooling agent is discharged from an exhaust vent.

6. The system of claim 5, further comprising:
a controller to control valves that feed the cooling agent into the heat transfer apparatus and that discharge the cooling agent from the exhaust vent; and
one or more sensors that output sensor data, wherein the controller operates the valves based on the sensor data indicting at least one of a temperature of the filtered cooled air fed into the gas turbine, a temperature of the finned metal tubes of the heat transfer apparatus, and a temperature of the cooling agent flowing through the finned metal tubes of the heat transfer apparatus.

7. An inlet and exhaust transport, comprising:
an air inlet filter housing receiving cooled air that is cooled by a separate heat transfer apparatus for absorbing heat from ambient air and outputting the cooled air, wherein the air inlet filter housing filters the cooled air;
a combustion air connection that is coupled to an outlet of the air inlet filter housing, the combustion air connection being adapted to be coupled to an inlet plenum of a gas turbine mounted on a separate power generation transport; and
one of: (i) a gravity driven passageway which prevents ice from entering the inlet plenum of the gas turbine on the separate power generation transport by an act of gravity, the gravity driven passageway being provided in the combustion air connection, or (ii) a filter that is provided in the combustion air connection.

8. A method for cooling intake air, the method comprising:
absorbing heat from ambient air with a heat transfer apparatus and outputting cooled air to an air inlet filter housing of a first transport;
receiving, at the air inlet filter housing of the first transport, the cooled air from the heat transfer apparatus, filtering the cooled air, and outputting the filtered air from a combustion air connection to a second transport, the second transport including a gas turbine, the gas turbine having an intake connected to an inlet plenum;
providing the cooled air via the combustion air connection to the intake of the gas turbine for combustion; and
one of: (i) preventing, with a gravity driven passageway in the combustion air connection, debris or ice from entering the intake of the gas turbine by an act of gravity, or (ii) filtering, with a filter disposed on the second transport upstream of the intake of the gas turbine, the cooled air received from the combustion air connection of the first transport.

9. The method of claim 8, further comprising:
filtering, with a filter disposed in the combustion air connection, the cooled air output from the air inlet filter housing.

10. The method of claim 8, further comprising:
filtering, with a filter disposed on the first transport upstream of the combustion air connection and inside the air inlet filter housing, the cooled air received from the heat transfer apparatus.

11. The method of claim 8, further comprising:
flowing a cooling agent through finned metal tubes of the heat transfer apparatus; and
causing the ambient air to come into contact with external surfaces of the finned metal tubes to absorb heat from the ambient air.

12. The method of claim 11, wherein the cooling agent is liquid nitrogen.

13. The method of claim 11, further comprising:
controlling valves that feed the cooling agent into the heat transfer apparatus and that discharge the cooling agent from the heat transfer apparatus based on sensor data received from one or more sensors, and
the sensor data indicting at least one of a temperature of the filtered cooled air fed into the gas turbine, a temperature of the finned metal tubes of the heat transfer apparatus, and a temperature of the cooling agent flowing through the finned metal tubes of the heat transfer apparatus.

\* \* \* \* \*